United States Patent [19]
Savall et al.

[11] 3,831,750
[45] Aug. 27, 1974

[54] SEPARATION OF ION EXCHANGE RESINS HAVING DIFFERENT DENSITIES

[75] Inventors: Vincent Savall, Velizy-Villacoublay; Pierre Treille, Saint-Cloud; Jean Bouchard, Paris, all of France

[73] Assignee: Degremont, Societe Generale D'Epuration et D'Assainissement, Rueil Malmaison, France

[22] Filed: Aug. 7, 1972

[21] Appl. No.: 278,284

[30] Foreign Application Priority Data
Dec. 9, 1971  France..........................71.29053

[52] U.S. Cl. ............................................... 209/160
[51] Int. Cl. ................................................ B03b 3/34
[58] Field of Search .......................... 209/158–161; 210/33, 189

[56] References Cited
UNITED STATES PATENTS

| | | | |
|---|---|---|---|
| 604,920 | 5/1898 | Rich.................................. | 209/160 |
| 1,410,152 | 3/1922 | Allen................................. | 209/160 |
| 2,767,140 | 10/1956 | Fitch................................. | 210/33 |
| 3,595,385 | 7/1971 | Duff.................................. | 209/160 X |
| 3,708,063 | 1/1973 | Morimasa........................ | 209/160 X |

FOREIGN PATENTS OR APPLICATIONS

| | | | |
|---|---|---|---|
| 255,875 | 3/1970 | U.S.S.R............................. | 209/158 |
| 77,708 | 3/1962 | France.............................. | 209/158 |

*Primary Examiner*—Frank W. Lutter
*Assistant Examiner*—Ralph J. Hill
*Attorney, Agent, or Firm*—Davis, Hoxie, Faithfull & Hapgood

[57] ABSTRACT

Improved fluidizing apparatus adapted to separate continuously ion exchange resins having different densities in order to perform their selective classification according to suitable granulometric distributions. The apparatus comprises a first separation chamber and in the lower portion of this first separation chamber a second chamber coaxially thereto having a gradually increasing cross-section from the bottom to the top.

This apparatus is notably applicable to a method of separation if ion exchange resins in movable-bed demineralizing installations in which the resins and their supporting fluid are introduced in the bottom of the second chamber in which they circulate upwards in the first chamber from which they are discharged in different zones depending on their densities.

5 Claims, 4 Drawing Figures

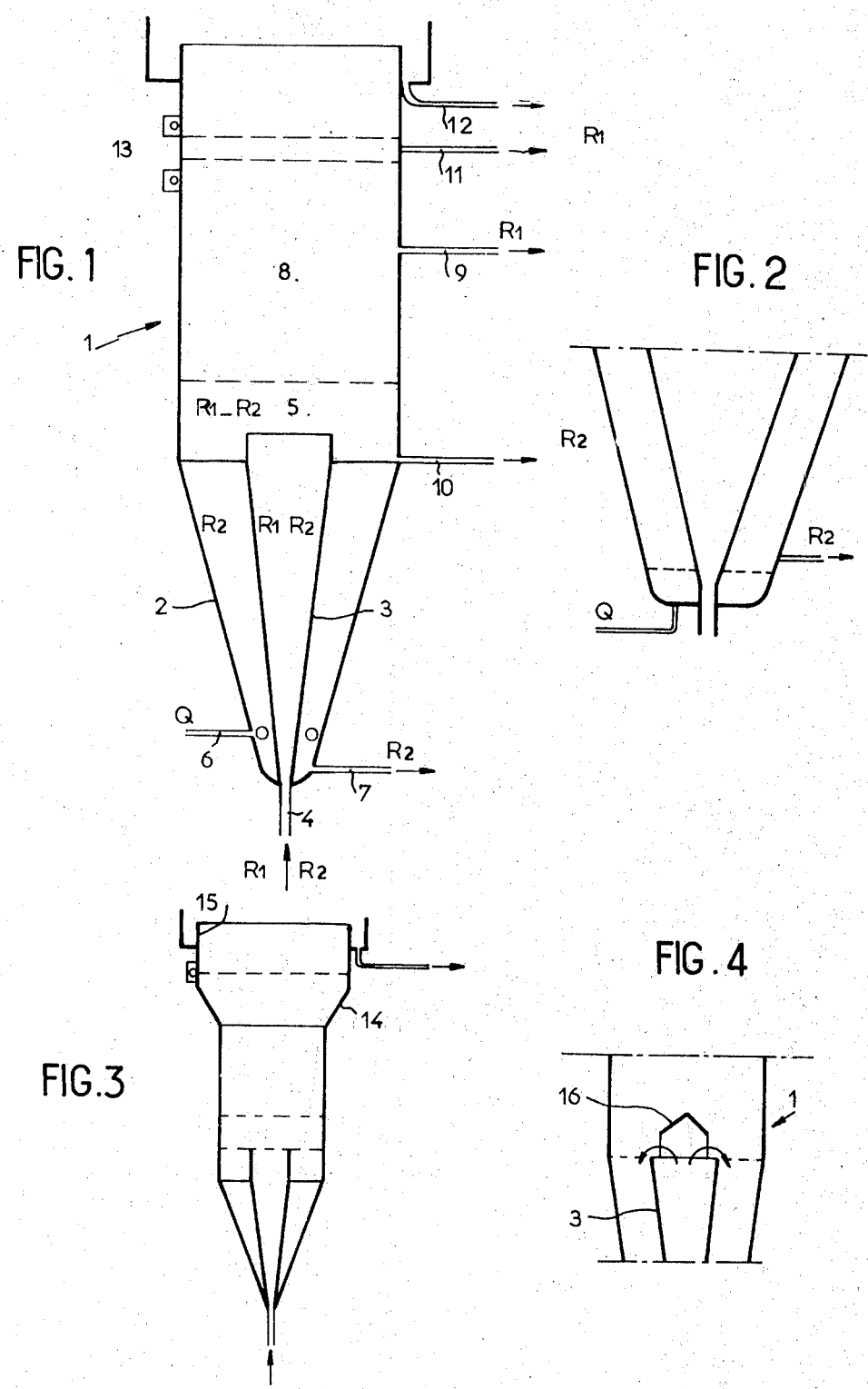

SEPARATION OF ION EXCHANGE RESINS HAVING DIFFERENT DENSITIES

BACKGROUND OF THE INVENTION

It is known to use the so-called fluidizing effect for separating ion exchange resins having different densities, by using an apparatus operating according to this fluidizing phenomenon and comprising two compartments separated by a wall and communicating with each other at their lower portions. The mixture of solid particles, for example of ion exchange resins, is introduced continuously into the separating apparatus, i.e., into the external compartment, and a sorting fluid is fed into both compartments through a grid arranged at the bottom thereof in order to produce a fluidized condition permitting relative movements between the grains for classifying them. According to the apparent density of these solid grains, the heaviest ones rise after the separation into a central compartment and are collected at the top thereof, and the lightest ones rise by expansion towards the upper portion of the outer compartment in which they are collected by overflow.

This type of apparatus is self-regulating; its efficiency is indisputable but the apparatus itself is attended by a major inconvenience when used in a continuous demineralizing installation wherein it is necessary to have the possibility of selecting a section in the granulometric curve of the ion exchange resins to be used, and notably to eliminate the finest particles; this apparatus operating by overflow does not permit choice and requires a subsequent separation for obtaining the desired granulometric section.

Another type of a apparatus now used in continuous demineralizing installations comprises a column or tower in which the mixture of ion exchange resins to be separated is introduced into a fluid medium by pulsations by means of a tube extending into the central portion of said column and adapted to direct the solid mixture in a downward direction. The heaviest products are extracted from the bottom of said column and the lighter ones are collected at the top.

The chief inconvenience of this type of apparatus lies in the fact that as a large volume of mixture of ion exchange resins is introduced into the column during a very short time period, the transfer speed is extremely high (of the order 1 to several m/s) thus producing a strong turbulence and, therefore a poor distribution of the granulometry of the separated solids.

BRIEF DESCRIPTION OF THE INVENTION

It is the essential object of the present invention to provide apparatus for the continuous separation of ion exchange resins having different densities, which is better suited for meeting practical requirements than hitherto known apparatus designed for the same purpose, notably in that the new apparatus according to this invention ensures a high degree of hydraulic stability of the ion echange resins and of the fluid contained in the apparatus, thus permitting of obtaining a suitable granulometric distribution of the various resins, selecting at will the desired granulometry section, and extracting the finest particles likely to interfere during subsequent operations (for example by clogging filter elements).

The present invention is concerned more particularly with an apparatus for the continuous separation, by fluidization, of ion exchange resins having different densities, which comprises a separation chamber equipped at the bottom of its lower portion with means for introducing a fluidizing liquid and other means for discharging the various types of resins of which the separation is thus performed, this apparatus being characterized in that another chamber is disposed within the lower portion of the separation chamber, coaxialy thereto; that said inner chamber has a cross-sectional area increasing gradually from base to top, and that it comprises at its bottom means for the continuous introduction of the mixture of ion exchange resins to be separated and of their fluid support.

According to a preferred form of embodiment of the present invention, the inner chamber is outflared upwards and supplied continuously at its bottom with the mixture of ion exchange resins to be separated and with their fluid support, said chamber having a frustoconical configuration.

According to another advantageous form of embodiment of this invention, the separation chamber is of cylindro-conical configuration and its lower portion, coaxial to said inner chamber, has a frustoconical configuration.

According to a third advantageous form of embodiment of this invention, overlying the separation chamber is a buffer chamber of cylindrical configuration having a greater diameter than said separation chamber.

According to another form of embodiment of the present invention the lower upwardly outflared chamber comprises thereabove a so-called "calming" device such as a baffle adapted to eliminate any propensity towards turbulence.

A specific form of embodiment of this invention is such that the means for introducing the fluidizing fluid into the lower portion of the separation chamber comprise a torus formed with suitable perforations, or any other suitable distributing device.

The apparatus according to this invention is applicable in a particularly advantageous manner, but not exclusively, to the separation of ion exchange resins in so-called movable-bed demineralization treatments.

One consequence of the arrangements according to this invention is the gradual reduction in the transfer rate of the ion exchange resins to be separated and also of their fluid support. This mixture introduced into the base or bottom of the inner chamber advantageously of frustoconical configuration flows upwards in said chamber at a speed decreasing as a function of the gradual increment in width of the flow surface area.

Since no turbulence is created in the upper portion of said frustoconical chamber, when the mixture of ion exchange resins penetrates at very low speed into the separating zones of the outer chamber, the heaviest grains separate more easily than the light ones.

If in addition the lower portion of the outer chamber in which the separation takes place is also of frustoconical configuration, the rate of fluidization decreases therein from the bottom upwards, thus facilitating the classification of heavy grains while preventing light ones from moving downwards.

In addition to the arrangements broadly set forth hereinabove, this invention also comprises other arrangements as will appear to those conversant with the art from the following disclosure.

This invention is directed more particularly to apparatus for the continuous separation of ion exchange resins having different densities, according to the arrangements disclosed in the foregoing, as well as to means for carrying out such apparatus and the installations in which said apparatus are incorporated.

A clearer understanding of the present invention will be had as the following description proceeds with reference to the attached drawing, in which:

BRIEF DESCRIPTION OF THE DRAWINGS

FIG. 1 is a diagrammatic axial-sectional illustration of an apparatus according to the various features set forth hereinabove which characterizes the present invention;

FIG. 2 is a diagrammatic illustration also in axial section showing on a larger scale the base of the apparatus according to the present invention;

FIG. 3 is a diagrammatic illustration showing on a smaller scale, also in axial section, another form of embodiment of the apparatus according to this invention, and FIG. 4 is a detail view showing one of the arrangements constituting the subject-matter of the present invention.

However, it will be readily understood that the attached drawing and the corresponding descriptions thereof are given by way of illustration, not of limitation, since various modifications may be brought thereto without departing from the spirit and scope of the invention.

DETAILED DESCRIPTION

The apparatus according to this invention as illustrated in FIG. 1 comprises a cylindro-conical chamber 1 having a frustoconical lower portion 2 in which an elongated frustoconical wall 3 is disposed coaxially to said frustoconical portion 2.

The mixture of ion exchange resins to be separated, denoted $R_1$ and $R_2$, together with their fluid support, are introduced continuously at 4 into the base of said frustoconical chamber 3; the mixture flows vertically upwards in said frustoconical section at a transfer rate decreasing gradually as a function of the widening of the flow face. At the upper portion of this frustoconical section the mixture penetrates at a very slow rate and without any turbulence into the separation zone 5 located at the base of the cylindrical portion of the separation chamber 1; the heaviest grains $R_2$ separate very easily and move dowawards along the lower frustoconical portion 2 of the outer chamber receiving in its lower portion, at 6, the fluidizing fluid which is caused to be spread throughout the free surface of the frustoconical wall 2 by means of a suitable distributor, such as a perforated torus (FIG. 1), a distributing floor (FIG. 2) or any other adequate means.

The homogeneous distribution of the fluidizing liquid is facilitated by the frustoconical configuration of the separation chamber, so that the so-called "rejection" effect is safely avoided. Moreover, due to this specific frustoconical configuration of the lower portion of the separation chamber, the fluidizing rate decreases from bottom to top, thus facilitating the classification of the heavier grains while preventing the lighter ones from moving downwards.

The heaviest grains of ion exchange resins ($R_2$) are discharged at 7 from the base of the lower portion of the separation chamber.

The lighter grains $R_1$ of the ion exchange resins remain at 8 in the cylindrical portion of said chamber 1, above the separation zone. They are discharged at 9.

In contrast with prior apparatus, the apparatus according to the present invention afford an efficient separation of fines.

The fines (or particles having the finest diameter) of the ion exchange resins $R_2$ are discharged at 10 from the upper portion of the zone containing the heaviest resins, and those of the ion exchange resins $R_1$ are discharged at 11 from the upper portion of the separation zone in which the lighter resins are retained.

The fluidizing liquid is discharged at 12 from the upper portion of the separation chamber.

The upper level 13 of the layers of ion exchange resins is regulated by means of a suitable device of any suitable type, such as a supersonic level detector, a photocell device, etc...

According to a modified form of embodiment of the apparatus of this invention, the upper zone 8 of the apparatus has a frustoconical configuration.

According to an advantageous form of embodiment of this invention the upper portion 8 comprises two cylinders of different diameters which are superposed to each other and interconnected by a frustoconical portion 14 (see FIG. 3), the upper cylinder 15 being used for constituting a buffer storage room in order to decrease the fluidizing rate.

According to another advantageous form of embodiment of this invention (see FIG. 4) the upper portion of the frustoconical chamber 4 comprises a "calming" device 16 such as a baffle for positively eliminating any possibility of generating turbulent movements.

The apparatus according to this invention operates as follows:

An experimental column of cylindrical configuration having a diameter of 600 mm and containing 400 liters of resins proved to be capable of separating 1,200 liters per hour of a mixture of cationic and anionic ion exchange resins. During one minute and 30 seconds a mixture of cationic and anionic ion exchange resins and their supporting fluid, in this case water, was introduced at an output rate of 13 cubic meters per hour into the lower portion of the inner cone of the apparatus. The transfer rate of 8m/s at the base of the cone dropped to 8 cm/s at the upper portion thereof. After 1 minute's rest, less than 1 percent of cationic resins was found at 30 cm above the separation zone whereas 99.8 percent of these cationic resins were found in the lower portion of the column. After removing the resins and recycling, the values obtained with further measurements proved to be exactly the same.

From the foregoing it appears that whatever the forms of embodiment contemplated, the present invention provides apparatus for the continuous separation of ion exchange resins having differents densities, these apparatus being characterized, in comparison with prior art apparatus having the same purpose, by the following advantages, in addition to those already mentioned hereinabove: a simple construction and the possibility of performing a continuous and extremely efficient separation of the ion exchange resins of different types with the particularly advantageous possibility of permitting the removal of the desired granulometric layers under constant proportion conditions.

As will be readily understood from the foregoing, this invention should not be construed as being strictly limited by the specific forms of embodiment described and illustrated herein, since many modifications may be brought thereto without departing from the basic principle of the invention as set forth in the appended claims.

What is claimed is:

1. Apparatus for the continuous separation of ion exchange resins according to differences in apparent density which comprises; a separation chamber having a conical lower portion outflared upwards and merged with a cylindrical upper portion, an open top conical inner chamber outflared upwards coaxial with and generally coextensive in height with the conical lower portion of the separation chamber, the annular space between the inner chamber increasing in cross-sectional area upwards, means for continuously introducing mixed ion exchange resins to the bottom of the inner chamber, means for continuously introducing separating fluid to the lower portion of the annular space between the inner chamber and the lower portion of the separation chamber, and means to discharge the separated ion exchange resins from the upper portion of the separation chamber.

2. Apparatus according to claim 1 wherein the upper portion of the separation chamber is surmounted by a further cylindrical chamber of greater diameter than the upper portion of the separation chamber and said further chamber is connected to the top of the separation chamber by a conical segment outflared upwards.

3. Apparatus according to claim 1 wherein baffle means for calming turbulency overlies the top of the inner chamber.

4. Apparatus according to claim 1 wherein said means for continuously introducing separating fluid comprise means to evenly distribute the fluid about the annular space.

5. Apparatus according to claim 1 wherein said means to evenly distribute fluid comprise a perforated toroidal member.

* * * * *